United States Patent [19]
Nguyen

[11] Patent Number: 5,148,359
[45] Date of Patent: Sep. 15, 1992

[54] NETWORK FOR OBTAINING HIGH POWER AND LOW TOTAL HARMONIC DISTORTION

[75] Inventor: Long T. Nguyen, Salem, Mass.

[73] Assignee: GTE Products Corporation, Danvers, Mass.

[21] Appl. No.: 812,089

[22] Filed: Dec. 23, 1991

[51] Int. Cl.⁵ ............................................. H02M 1/12
[52] U.S. Cl. ................................... 363/48; 323/205; 323/208; 333/175
[58] Field of Search .................. 363/47, 48; 323/205, 323/208; 333/172, 175, 176, 178, 181

[56] References Cited

U.S. PATENT DOCUMENTS

| | | | |
|---|---|---|---|
| 4,222,096 | 9/1980 | Capewell | 363/44 |
| 4,369,490 | 1/1983 | Blum | 363/48 |
| 4,672,522 | 6/1987 | Lesea | 363/48 |
| 4,749,913 | 6/1988 | Stuermer et al. | 315/175 |
| 4,914,559 | 4/1990 | Deisch | 363/48 |
| 4,930,061 | 5/1990 | Slack et al. | 363/48 X |
| 4,961,044 | 10/1990 | Kravitz | 323/205 |
| 5,012,161 | 4/1991 | Borowiec et al. | 315/247 |

FOREIGN PATENT DOCUMENTS 0163271 9/1983 Japan .................. 363/48 X

OTHER PUBLICATIONS

Powertechnics Magazine, Feb. 1991, pp. 20-24, Wilkenson, Bruce, "Power Factor Correction and IEC 555-2".
Compliance Engineering, Fall 1991, pp. 33-39, Martin, Robert, "Harmonic Distortion and IEC 555-2".

Primary Examiner—Emanuel T. Voeltz
Attorney, Agent, or Firm—Carlo S. Bessone

[57] ABSTRACT

An arrangement includes a network for connection between an AC power supply and the input of a DC power supply containing rectifiers and a filter capacitor. The network forms a third order, damped low-pass filter that waveshapes the AC input current so as to either reduce or remove the magnitude of harmonics which primarily cause distortion of the input current waveform. In a preferred embodiment, the waveshaping network includes an inductor connected in series with the input of the DC power supply. A series combination of a damping resistor and a first capacitor is connected in parallel with the series inductor. A second capacitor is connected in shunt with the input terminals of the DC power supply. The waveshaping network increases the power factor and lowers the total harmonic distortion the input of the DC power supply presents to the AC power supply.

14 Claims, 2 Drawing Sheets

NETWORK FOR OBTAINING HIGH POWER AND LOW TOTAL HARMONIC DISTORTION

FIELD OF THE INVENTION

This invention relates to a DC power supply, and more specifically relates to a network for use with a DC power supply for obtaining a high power factor and low total harmonic distortion (THD).

BACKGROUND OF THE INVENTION

Electronic circuits, such as gas discharge lamp ballasts, generally contain a means for converting AC line voltage to DC line voltage. A conventional way of obtaining the DC voltage from the AC line voltage is shown, for example, in FIG. 1 of Capewell U.S. Pat. No. 4,222,096 wherein a bridge rectifier and a filter capacitor are employed. However, it is known that in such a circuit the power factor is relatively low (i.e., 40 to 70%). Referring to FIG. 6a of Capewell, the power factor of a rectifying network will be maximized when the phase difference between the line voltage and the line current is minimal and further when the duty cycle of the line current is maximized. The duty cycle of the line current is defined as the per unit time that current flows from the line during each half cycle of line voltage. The rms current increases for a lower duty cycle because the waveform of instantaneous current i(t) is more peaked or has a shorter conduction period. Therefore, the input current necessary to support input power is very high and can exceed the ratings of conductors and circuit breakers.

The lighting industry has long recognized the advantage of high power factor circuits, and thus a power factor greater than 90% has become an actual requirement of ballasts for gas discharge lamps. Conventional, or electromagnetic, ballasts for gas discharge lamps employ bulky transformers and inductors as ballasting and power factor correcting elements to achieve a power factor of about 80–90%; yet, these bulky magnetic components dissipate a lot of power, lowering the efficiency of the ballasts. Acting as an inductive load, an electromagnetic ballast generates high third harmonic current as well (usually more than 30%).

In contrast to conventional electromagnetic ballasts, electronic ballasts represent non-linear resistive loads to the AC line due to large electrolytic filter capacitors across the output of the rectifying elements. Consequently, electronic ballasts draw non-sinusoidal current from sinusoidal voltage sources. Thus, a third order damped low pass filter, so called power factor and low total harmonic distortion correction, is needed to correct the waveshape of the AC line current charging the electrolytics of electronic ballasts.

In addition to a high power factor circuit, industry standards require lighting circuits to have a low total harmonic distortion (THD). THD is defined in the following equation:

$$THD = SQRT(N_2^2 + N_3^2 + \ldots)/N_1$$

where,

SQRT = Square-root;

$N_n$ = the magnitude of the nth harmonic frequency; and $N_1$ = the magnitude of the fundamental frequency.

In a simple DC power supply consisting of a bridge rectifier and a filter capacitor, the THD is high due to distortion in the current waveform which includes sharp peaks and conduction angle of less than 180 degrees. While present standards require a THD less than 32%, efforts are underway to require the THD limit to be less than 20%.

Capewell U.S. Pat. No. 4,222,096 proposes a circuit with a high power factor which minimizes the phase difference between the line voltage and the line current and which maximizes the duty cycle of the line current. The circuit illustrated in FIG. 5 of U.S. Pat. No. 4,222,096, for example, includes an inductor and a capacitor connected in series with an AC source and the AC side of a rectifying element. The inductance-capacitance circuit resonates at a frequency of about three to six times the frequency of the input power supply. While this circuit produces a DC voltage with a high power factor, the THD is relatively high due to a distorted input current waveform resulting primarily from a high third harmonic component.

Lesea U.S. Pat. No. 4,672,522 describes a power factor correcting network connected in series with the input of a DC power supply across the AC power line. The network constitutes a third harmonic trap and comprises a parallel combination of an inductor and a capacitor. The inductor and capacitor resonate at a frequency greater than three and less than four times the power line frequency. While the above network is considerably effective at power factor correction and third harmonic control, in practice, it has been found that the series-connected capacitor tends to resonate with the inductance of the power line conductor creating a ringing phenomena which increases the magnitude of higher order harmonics. Moreover, since the currents through the inductor and capacitor in such a network are 180 degrees out of phase, they tend to cancel out if both are equal in magnitude. This cancellation phenomenon occurs at the beginning of every half cycle resulting in a zero current angle THETA and less than 180 degree conduction angle which contributes to higher order distortion.

SUMMARY OF THE INVENTION

It is, therefore, an object of the present invention to obviate the disadvantages of the prior art.

It is another object of the invention to provide an improved network for a DC power supply which provides both a high power factor and a low total harmonic distortion.

It is yet another object of the invention to provide an improved network for a DC power supply which effectively blocks the third harmonic component.

These objects are accomplished in one aspect of the invention by the provision of a power supply arrangement having a high power factor and low total harmonic distortion. The power supply arrangement comprises a DC power supply having AC input terminals and DC output terminals and including rectifier means and filter capacitor means. An inductor is connected in series with one of the AC input terminals of the DC power supply. A resistor and a first network capacitor are connected in series. The series combination of the resistor and first network capacitor is connected in parallel with the series inductor. A second network capacitor is connected in shunt with the AC input terminals of the DC power supply. Means are provided for connecting the power supply arrangement to an AC power supply.

The above objects are accomplished in another aspect of the invention by the provision of a network for use with an AC power supply and for use with a DC power supply having an input that presents a predetermined power factor and total harmonic distortion to the AC power supply when directly connected thereacross. The network for connection to the input of the DC power supply increases the power factor and lowers the total harmonic distortion the input of the DC power supply presents to the AC power supply. The network comprises an inductor connected in series with the input of the DC power supply. A resistor and a first network capacitor are connected in series. The series combination of the resistor and the first network capacitor is connected in parallel with the inductor. A second network capacitor is connected in shunt with the input of the DC power supply. Means are provided for connecting the network to both the AC and DC power supplies.

Additional objects, advantages and novel features of the invention will be set forth in the description which follows, and in part will become apparent to those skilled in the art upon examination of the following or may be learned by practice of the invention. The aforementioned objects and advantages of the invention may be realized and attained by means of the instrumentalities and combination particularly pointed out in the appended claims.

BRIEF DESCRIPTION OF THE DRAWINGS

The invention will become more readily apparent from the following exemplary description in connection with the accompanying drawings, wherein.

BEST MODE FOR CARRYING OUT THE INVENTION

For a better understanding of the present invention, together with other and further objects, advantages and capabilities thereof, reference is made to the following disclosure and appended claims in connection with the above-described drawings.

Figure 1:
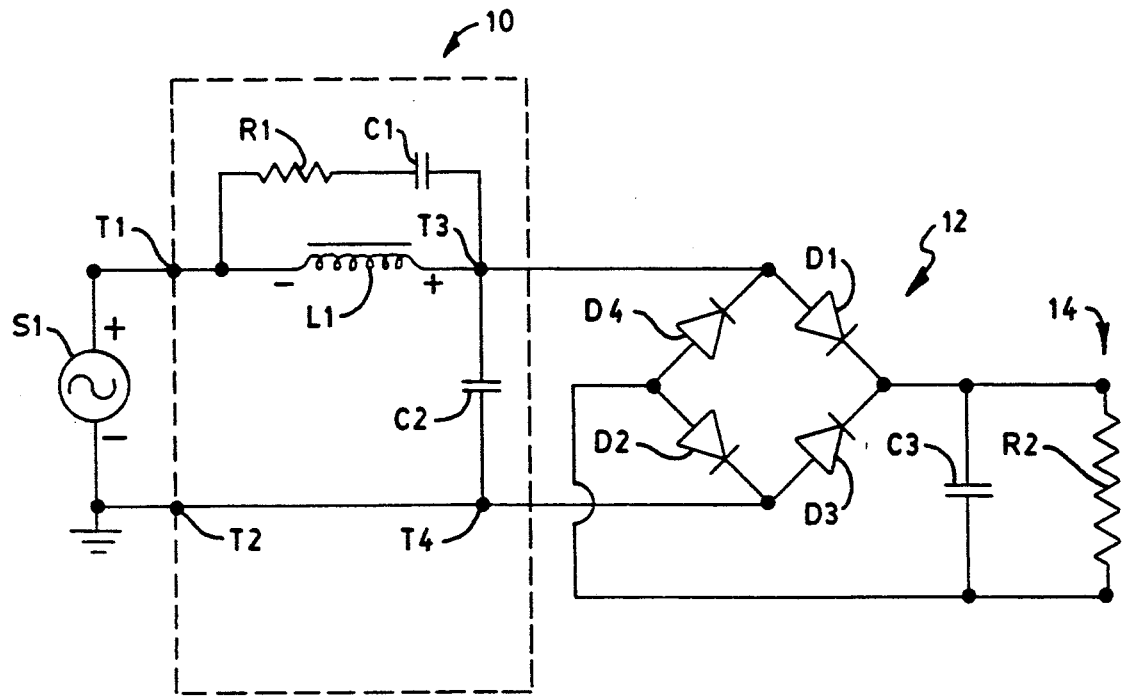
FIG. 1 is a schematic diagram of a network for use with a DC power supply for obtaining a high power factor and a low total harmonic distortion in accordance with the teaching of the present invention.

With particular attention to FIG. 1, there is illustrated an arrangement having a pair of input terminals T1, T2 connected to a suitable AC power supply S1, such as one having a magnitude of 108 to 132 volts and a frequency of 60 Hz. The arrangement includes a network 10 whose output is connected at a pair of terminals T3, T4 to a DC power supply 12. Network 10 improves the power factor and decreases the total harmonic distortion of DC power supply 12. The output of DC power supply 12 is connected to a suitable DC load 14 which in FIG. 1 is represented by a load impedance R2.

DC power supply 12, which has an AC input at terminals T3, T4, may comprise a full-wave bridge rectifier consisting of diodes D1, D2, D3, D4 and an electrolytic filter capacitor C3. A load 14, connected to the DC output of power supply 12 and represented by resistor R2, may comprise an electronic ballast circuit suitable for starting and operating one or more gas discharge lamps.

Such a simple DC power supply consisting of a bridge rectifier and a filter capacitor has a low duty cycle and very low power factor and, therefore, unduly loads the AC line. The circuit also has a disadvantage that large peak currents are drawn which greatly disrupt the AC line voltage. Moreover, there will be a large in-rush current to charge the filter capacitor when the circuit is first turned on which might falsely trip branch protection devices. The large current peaks and low duty cycle contribute to a high THD.

In accordance with the teachings of the invention, a network 10 is connected between AC power supply S1 and the input of DC power supply 12. Network 10 forms a third order, damped low-pass filter that waveshapes the AC input current so as to reduce (or remove) the magnitude of all harmonics that primarily cause the fundamental wave to be distorted. Moreover, network 10 reduces the line current distortion caused by a DC power supply having rectifying elements and a large electrolytic capacitor at the DC output.

In a preferred embodiment, network 10 includes an inductor L1 having a typical inductance of about 20–500 mH connected in series with terminal T3 of DC power supply 12. A damping resistor R1 having a typical resistance of about 5–70 ohms and a capacitor C1 having a typical capacitance of about 0.47–10.0 mfd are connected in series between terminals T1 and T3. The series combination of resistor R1 and capacitor C1 is connected in parallel with inductor L1. Network 10 further includes a capacitor C2 having a typical capacitance of about 0.47–10.0 mfd connected in shunt with the AC input terminals T3, T4 of DC power supply 12.

Unlike undamped parallel inductive-capacitance (LC) resonant circuits which have a very high quality factor Q and a very narrow bandwidth BW (due to negligibly small equivalent series resistance ESR of the capacitor), non-resonant network 10 has a low quality factor Q typically in the order of from 0.1–10. The bandwidth BW of network 10 is increased in accordance with the following equation:

$$BW = Fr/Q_{net1}$$

where,

Fr = frequency = 1/[2PI * SQRT(L1C1)];
SQRT = Square-root;
$Q_{net1}$ = (QC1*QL1)/(QC1+QL1);
QC1 = XC1/R1 and QL1 = XL1/$R_{cu}$; and
$R_{cu}$ = copper wire resistance of L1.

Typically, the bandwidth of network 10 is from about 30–300.0 Hz.

The function of resistor R1 is threefold. First, resistor R1 damps out the natural resonant disturbance which is caused by the distributed and leakage inductance of the AC source and the series-connected capacitor C1. Second, resistor R1 increases the bandwidth of the network so that it "chokes" more of the energy which is being circulated by the third and fifth harmonics of the line current. Third, resistor R1 attenuates high frequency current harmonics and reduces dV/dt across capacitors C1 and C2.

The damping effect caused by resistor R1, reduces the rate at which the reactive energies are being transported or circulated back and forth in the circuit. Damping factor is inversely proportional to quality factor of the circuit/components. Thus, to increase damping is equivalent to reducing quality factor of the circuit.

In analyzing the damping effect of network 10, an inductor $L_s$ (not illustrated) having an inductance equal to that of the power line conductor is presumed in series with capacitor C1 and resistor R1. Since inductor L1 does not affect the ringing effect, inductor L1 can be considered an open circuit. Therefore, the behavior of this series resonant $L_s$C1R1 circuit can be approximated by the following equations:

$$Q_{net2} = (1/R1)*SQRT(L_s/C1) \text{ and}$$

$$Fr = 1/[2PI*SQRT(L_sC1)].$$

The quality factor $Q_{net2}$ has a value greater than or equal to zero but less than or equal to 1. Typically, the quality factor of this series resonant $L_s$C1R1 circuit is equal to 0.40.

The primary role of capacitor C2 is to prevent an equal amount of current from flowing into inductor L1 and capacitor C1 at zero-crossing of the line current. Without capacitor C2, there would be two equal and 180 degrees out of phase currents flowing into inductor L1 and capacitor C1 at the beginning and end of every half-cycle of the line current. The sum of these two currents is equal to zero, resulting in a wide zero current angle (THETA). To reduce the angle THETA to zero, and at the same time, to reconstruct the line current waveshape similar to that of a sine wave, a capacitor C2 is needed to shunt across the line voltage. The value of capacitor C2 can be approximated by the following equation:

$$C2 = IPEAK*sine(THETA)*T/2VBUS$$

where,
IPEAK = the line peak current;
T = time of zero crossing = THETA/(2PI*$F_{line}$)
= THETA/377 (for 60 Hz);
and $V_{bus}$ = the DC voltage after rectification.

Figure 2:
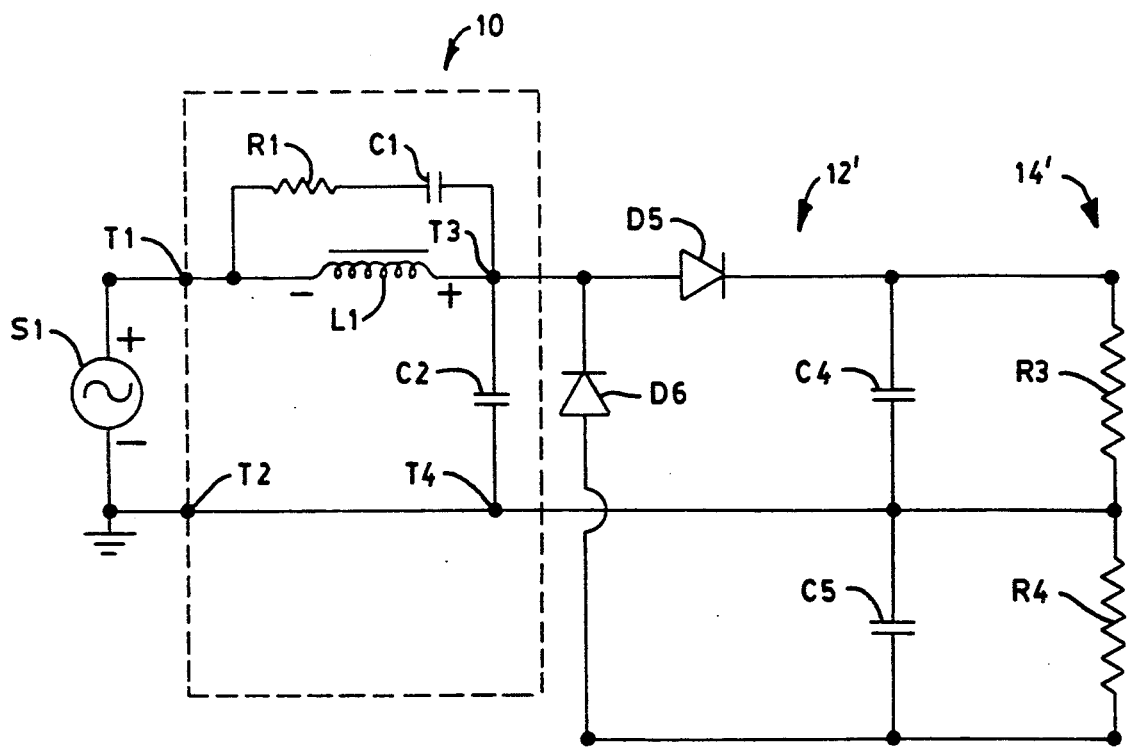
FIG. 2 is a schematic diagram of the network of FIG. 1 used with another DC power supply.

FIG. 2 illustrates network 10 connected to the input of a DC power supply 12' consisting of a voltage doubler arrangement which includes diodes D5, D6 and capacitors C4, C5. A load 14', represented by resistive impedances R3, R4, are connected to the output of DC power supply 12'.

In a typical but non-limiting example of a network in accordance with the present invention, network inductor L1 has an inductance equal to about 150.0 mH and damping resistor R1 has a resistance equal to about 42 ohms. First network capacitor C1 is connected in series with the damping resistor and has a capacitance equal to about 3.3 mfd. Second network capacitor C2 having a capacitance equal to about 4.7 mfd is connected in a shunting relationship across the input of a DC power supply consisting of a bridge rectifier and a filter capacitor.

Figure 3:
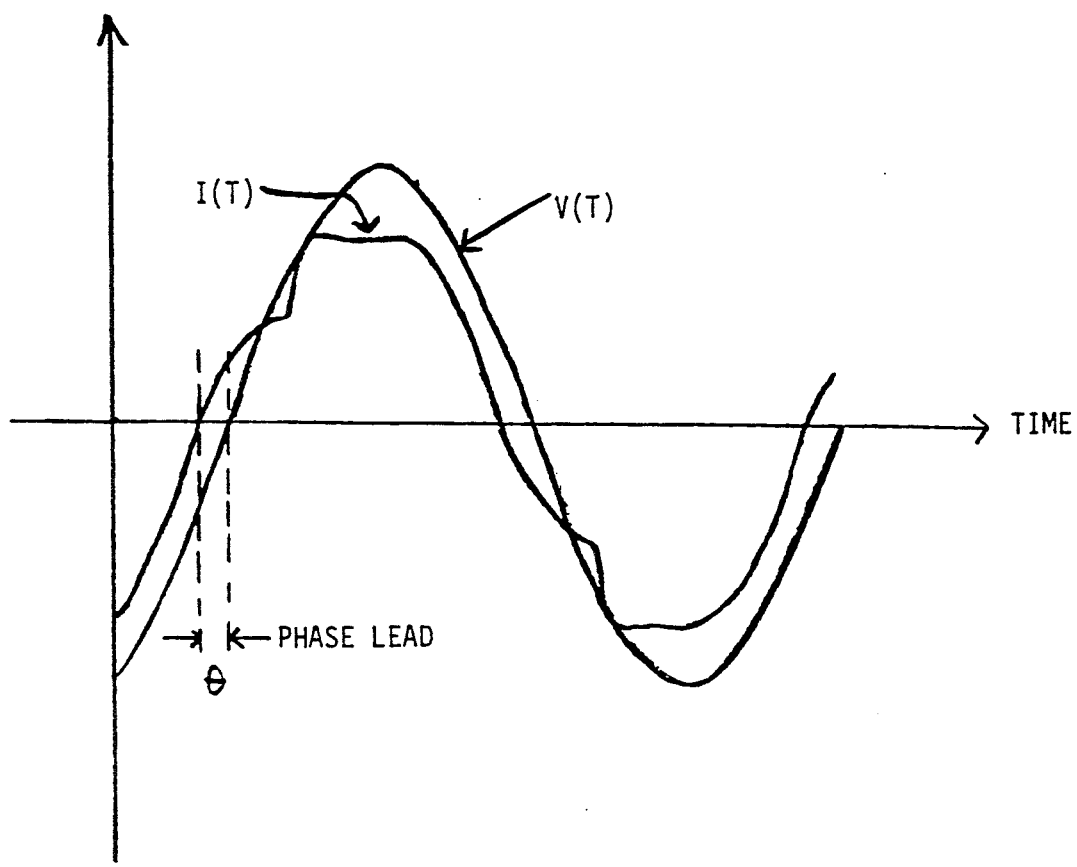
FIG. 3 illustrates typical input current and line voltage waveforms of the circuit of FIG. 1.

FIG. 3 illustrates typical input current and line voltage waveforms of a network of the present invention using the component values given above for inductor L1, resistor R1 and capacitors C1 and C2 at 60 Hz. The rms current is 0.55 amperes with a phase angle THETA of 16.0 degrees with respect to the line voltage. The resulting power factor was equal to about 94.5% and the total harmonic distortion was equal to 17.0%. The third harmonic component had a value equal to about 12.0%.

Although the current waveform in FIG. 3 is shown leading the voltage waveform, the phase shift angle THETA between the input line voltage and input current may also be lagging or zero depending upon the selection of capacitors C1, C2 and inductor L1.

Comparing the results of the above example with the prior art, it was discovered that a circuit constructed similar to the embodiment depicted in FIG. 5 of Capewell U.S. Pat. No. 4,222,096, had a high power factor. However, the total harmonic distortion was measured to be about 29% due to a distorted input current waveform resulting from a third harmonic component of 26%. A network constructed similar to the embodiment depicted in FIG. 2 of Lesea U.S. Pat. No. 4,672,522, had a high power factor but a total harmonic distortion of about 28%. The third harmonic component was equal to 18%.

There has thus been shown and described a network for a DC power supply which effectively blocks the third harmonic component. The network provides both a high power factor and a low total harmonic distortion.

While there have been shown and described what are at present considered to be the preferred embodiments of the invention, it will be apparent to those skilled in the art that various changes and modifications can be made herein without departing from the scope of the invention. The actual scope of the invention is intended to be defined in the following claims when viewed in their proper perspective based on the prior art.

What is claimed is:

1. A power supply arrangement having a high power factor and low total harmonic distortion, said power supply circuit comprising:
    a DC power supply having AC input terminals and DC output terminals and including rectifier means and filter capacitor means;
    an inductor connected in series with one of said AC input terminals of said DC power supply;
    a resistor and a first network capacitor connected in series; the series combination of said resistor and said first network capacitor being connected in parallel with said inductor;
    a second network capacitor connected in shunt with said AC input terminals of said DC power supply; and
    means for connecting said power supply arrangement to an AC power supply.

2. The power supply arrangement of claim 1 wherein said rectifier means of said DC power supply comprises a bridge rectifier.

3. The power supply arrangement of claim 1 wherein said rectifier means of said DC power supply comprises a pair of diodes.

4. The power supply arrangement of claim 1 wherein said inductor has an inductance equal to about 20–500 mH.

5. The power supply arrangement of claim 1 wherein said first network capacitor has a capacitance equal to about 0.47–10.0 mfd.

6. The power supply arrangement of claim 1 wherein said second network capacitor has a capacitance equal to about 0.47–10.0 mfd.

7. The power supply arrangement of claim 1 wherein said resistor has a resistance equal to about 5–70 ohms.

8. A network for use with an AC power supply and for use with a DC power supply having an input that presents a predetermined power factor and total harmonic distortion to the AC power supply when directly connected thereacross, said network for connection to the input of the DC power supply to increase the power factor and lower the total harmonic distortion the input of the DC power supply presents to the AC power supply, the network comprising:
- an inductor connected in series with the input of said DC power supply;
- a resistor and a first network capacitor connected in series; the series combination of said resistor and said first network capacitor being connected in parallel with said inductor;
- a second network capacitor connected in shunt with the input of said DC power supply; and
- means for connecting said network to said AC and DC power supplies.

9. The network of claim 8 wherein said rectifier means of said DC power supply comprises a bridge rectifier.

10. The network of claim 8 wherein said rectifier means of said DC power supply comprises a pair of diodes.

11. The network of claim 8 wherein said inductor has an inductance equal to about 20–500 mH.

12. The network of claim 8 wherein said first network capacitor has a capacitance equal to about 0.47–10.0 mfd.

13. The network of claim 8 wherein said second network capacitor has a capacitance equal to about 0.47–10.0 mfd.

14. The network of claim 8 wherein said resistor has a resistance equal to about 5–70 ohms.

* * * * *